United States Patent [19]

Pfaff et al.

[11] Patent Number: 5,611,852
[45] Date of Patent: Mar. 18, 1997

[54] STABILIZED CONDUCTIVE PIGMENT

[75] Inventors: Gerhard Pfaff; Hans-Dieter Bruckner, both of Darmstadt, Germany

[73] Assignee: Merck Patent Gesellschaft mit beschrankter Haftung, Darmstadt, Germany

[21] Appl. No.: 291,795

[22] Filed: Aug. 16, 1994

[30] Foreign Application Priority Data

Aug. 17, 1993 [DE] Germany ............... 43 27 620.2

[51] Int. Cl.$^6$ ........................................ C09C 1/04
[52] U.S. Cl. ................... 106/428; 106/426; 106/415; 106/417; 254/500; 254/520; 254/521; 423/598; 423/622
[58] Field of Search .................. 106/426, 428, 106/415, 417; 423/598, 622; 252/520, 521, 500

[56] References Cited

U.S. PATENT DOCUMENTS

| 2,140,235 | 12/1938 | Lederle et al. ............... 106/428 |
| 4,279,961 | 7/1981 | Fujioka et al. ............... 428/328 |
| 4,803,144 | 2/1989 | Hosoi ............... 430/106.6 |
| 5,102,650 | 4/1992 | Hayashi et al. ............... 423/622 |
| 5,132,104 | 7/1992 | Yamamoto et al. ............... 423/419 |
| 5,171,364 | 12/1992 | Sato et al. ............... 106/425 |
| 5,312,614 | 5/1994 | Hayashi et al. ............... 423/622 |

FOREIGN PATENT DOCUMENTS

| 405364 | 6/1990 | European Pat. Off. . |
| 404087 | 6/1990 | European Pat. Off. . |
| 639625 | 2/1995 | European Pat. Off. . |
| 03/200877 | 9/1991 | Japan . |
| 91/13120 | 2/1991 | WIPO . |

OTHER PUBLICATIONS

Abstract of JP 4,098,888. Mar. 1992.
Abstract of JP 52 009 432. Jan. 1977.
Abstract of JP 62 035 970. Aug. 1987.
Abstract of JP 57 057 758. Apr. 1982.

*Primary Examiner*—Mark L. Bell
*Assistant Examiner*—Scott L. Hertzog

[57] ABSTRACT

A stabilized conductive pigment based on aluminum-doped zinc oxide which, for stabilizing the electric conductivity, contains an alkaline earth metal titanate or an oxide of an element from group III or IV.

16 Claims, No Drawings

STABILIZED CONDUCTIVE PIGMENT

BACKGROUND OF THE INVENTION

The invention relates to a stabilized conductive pigment based on aluminum-doped zinc oxide (AZO). In many areas of industry, there is a need for conductive pigments which make it possible to produce, for example, plastics, paints, coatings or fibers which are electrically conductive, antistatic or provide shielding from electromagnetic waves. For this purpose, conductive carbon black is used in large amounts but cannot be employed for transparent, light-colored or colored coatings due to its high light absorption in the visible region of the spectrum. Another problem is the strong absorption of carbon black in the IR region, as a result of which the coated articles heat up when exposed to solar radiation for example, which is often undesirable. In the case of light-colored coatings, carbon black has therefore increasingly been replaced by antimony-doped tin oxide.

Another conductive pigment which is suitable for light-colored coatings is aluminum-doped zinc oxide.

DE-A 4,023,802 describes the preparation of needle-shaped zinc carbonate, which is used as a precursor for producing needle-shaped electrically conductive zinc oxide. When doped with aluminum, indium, gallium and tin, the products obtained are light grey to light brown. Doping with germanium produces a white powder. The electrically conducting zinc oxide powder needle-shaped particles having a length ratio of 3 to 400 or platelet-like particles having a length/thickness ratio of 10 to 1000. Calcining of the pigment is carried out in a reducing atmosphere under nitrogen.

EP-A-0,404,087 and EP-A-0,405,364 disclose a needle-shaped electrically conducting zinc oxide and a process for its preparation.

An alkali metal zincate solution containing a water-soluble compound of at least one of the metals tin, gallium, indium and aluminum is neutralized with an inorganic acid in such a manner that the pH at the end of the reaction is in the range from 7 to 12. The resulting mixed precipitation products are filtered off, washed and dried and then calcined in a reducing atmosphere. The electrically conducting zinc oxide obtained contains 0.005 to 5 parts by weight of the metal oxides used as doping substance per 100 parts by weight of zinc oxide. Compared with incorporated spherical electrically conducting zinc oxide, the electrical volume resistivity of a film containing the needle-shaped product is lower by about 3 powers of ten. The needle-shaped structure of the zinc oxide leads to better conductivity of the pigmented film.

Furthermore, JP-A-03/200,877 discloses an electrically conducting powder consisting of a support and a zinc oxide layer deposited thereupon. The zinc oxide is doped with a tri- or tetravalent metal. This metal can be aluminum, germanium, gallium, tin or indium.

Examples of the supports used are mica, kaolin, zinc oxide, titanium oxide, glass fiber or glass platelets. The electrically conductive powder is prepared by suspending the support in the aqueous solution of a zinc salt of an organic acid and of a salt of a tri- or tetravalent metal, adjusting the pH to 5 to 9, and depositing the precipitated metal hydroxides/hydrated metal oxides on the support.

The resulting product is separated off, washed and dried and calcined at 500° to 1300° C., preferably 500° to 900° C., in a reducing gas atmosphere.

Conductive pigments based on zinc oxide have the disadvantage that storage of these pigments in air leads to a marked decrease in their electric conductivity over time. The resistivity, which is about 2 to 4 ohm×cm immediately after preparation of the pigment, can rise to several times the original value in the course of a few weeks.

This is why it has been suggested in EP-A-0,500,445 to protect the conductive layer against oxidation by overcoating it with a metal oxide, for example alumina or silica.

However, a protective layer made of a non-conducting material has the disadvantage of reducing the conductivity of the pigment.

SUMMARY OF THE INVENTION

An object of the invention is to provide a conductive pigment based on aluminum-doped zinc oxide whose electric conductivity remains stable to the largest possible extent even after extended storage in air.

According to the invention, this object is achieved by a stabilized conductive pigment based on aluminum-doped zinc oxide which contains an additive for stabilizing the electric conductivity. In particular, the invention involves a stabilized conductive pigment, comprising a layer containing both doped zinc oxide, and an additive which acts to stabilize the electric conductivity.

Furthermore, according to the invention, this object is achieved by a process for preparing a stabilized conductive pigment. The process comprises metering salts of zinc, aluminum and additive either jointly or separately and, in the case of stabilization with titanates, preferably together with a hydrogen peroxide solution continuously and at a predetermined mixing ratio to the aqueous reaction medium. In the case where a support is used, the aqueous reaction medium contains a suspension of this support, at a pH of preferably 7 to 12, more preferably 8 to 10, at temperatures of preferably 50° to 90° C., more preferably 60° to 80° C., in such a manner that in each case hydrolysis of the metal salts and precipitation of the hydrated oxide/hydroxide or, in the case where a support is used, deposition on the platelet-like support take place immediately and no soluble basic compounds are formed.

Under these conditions, alkaline earth metal ions together with titanium-containing species produce, in the presence of hydrogen peroxide, titanium peroxo-complexes which can be converted into titanates by a heat treatment above 500° C. (G. Pfaff, Journal of Materials Science 27 (1992), 1222–1226). After coating is complete, the pigments are separated off from the suspension, washed and dried and calcined at temperatures in the range from preferably 500° to 900° C., more preferably at 550° to 650° C., preferably for 30 to 60 minutes. Calcining is carried out in a reducing atmosphere in combination with an inert gas atmosphere, preferably using a nitrogen/hydrogen mixture (forming gas).

The invention also provides paints, plastics or coatings pigmented with the pigment according to the invention.

As used herein, additives for stabilizing the electric conductivity are substances which prevent oxidation of the conductive system. Such additives are alkaline earth metal titanates, such as strontium titanate, barium titanate, calcium titanate or magnesium titanate or oxides of elements from Group III and IV, such as germanium dioxide, gallium(III) oxide, indium(III) oxide and, preferably, tin dioxide. They are precipitated together with zinc and the doping element from the solutions in order to achieve homogeneous distribution in the conductive system.

The concentration of the additives in the conductive layer is 0.5 to 5% by weight, based on the conductive layer.

The conductive system consisting of aluminum-doped zinc oxide is either the sole component of the conductive pigment or has been deposited on a support.

In the conductive system, a zinc/aluminum ratio of 2:1 to 20:1, preferably 5:1 to 10:1, is maintained.

Suitable platelet-like supports are natural or synthetic mica, other sheet silicates, such as talc, kaolin, sericite or glass platelets. In the case of mica as the support, the fraction having a particle size of less than 15 pm is used. These supports can also have been coated with one or more metal oxide layers. Useful supports are also platelet-like (i.e., platelet-shaped, preferably pearlescent, i.e., nacreous) pigments prepared in accordance with the international PCT application EP 92/02,351 on a continuous belt.

Preferred supports are mica flakes coated with metal oxides, such as known, for example, from U.S. Pat. Nos. 3,087,828 and 3,087,829.

The metal oxides used are either colorless highly refractive metal oxides, such as, in particular, titanium dioxide and/or zirconium dioxide, or colored metal oxides, such as, for example, chromium oxide, nickel oxide, copper oxide, cobalt oxide and, in particular, iron oxides, such as, for example, $Fe_2O_3$ or $Fe_3O_4$ or mixtures of such metal oxides. Such metal oxide/mica pigments are commercially available under the tradenames Afflair® and Iriodin® (prepared by E. Merck, Darmstadt).

To measure the resistivity of the pigments, a small amount of about 0.5 g of pigment is compressed in an acrylic glass tube 2 cm in diameter by means of a weight of 10 kg between two metal pistons. The electrical resistance R of the pigments thus compressed is then measured. The resistivity p is calculated from the layer thickness L of the compressed pigment using the relationship $$\rho = R \cdot \frac{\pi \cdot (d/2)^2}{L} \quad [\text{Ohm} \cdot \text{cm}]$$

To measure the resistance of the pigmented application system, for example a paint, 15 parts by weight of pigment are incorporated in 85 parts by weight of binder solution (acrylic melamine resin). A thin film of this paint is applied to a metal sheet and the surface resistance measured in accordance with DIN Standard 53596 using a flexitongue electrode.

Only a slight deterioration in the electric conductivity of the pigment is observed upon extended storage of the invention. Immediately after preparation, the electric resistance as measured by the above-mentioned method is 2 to 3 kohm×cm. After a storage time of 4 weeks, this value approximately doubles. In contrast, the electric resistance of a non-stabilized pigment increases to as much as several times the original value over the same period.

In contrast, in the application system (paint), the resistance remains largely constant. This indicates that the deterioration in electric conductivity upon extended storage of the pigment in air is due to oxidation of the conductive system.

The examples which follow are intended to illustrate the invention without limiting it.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding German Application No. P 43 27 620.2, filed Aug. 17, 1993, are hereby incorporated by reference.

EXAMPLES

Example 1

50 g of mica having a particle size of <15 μm are suspended in 1800 ml of fully deionized water, the resulting suspension is heated to 75° C., and 1000 ml of a hydrochloric acid solution containing 166.3 g of $ZnCl_2$, 11.8 g of $AlCl_3 \times 6H_2O$, 0.8 g of $CaCl_2$ and 10 ml of conc. Hcl are continuously added with stirring over a period of 4 hours. At the same time, 0.7 g of $TiCl_4$ is metered to the mica suspension over this period. The suspension is kept at a constant pH of 9.0 over the entire reaction time by means of 10% sodium hydroxide solution. Simultaneously with the sodium hydroxide solution, 10 ml of 30% $H_2O_2$ solution are metered in. During the reaction, the added zinc ions and aluminum ions are deposited on the mica in the form of their hydroxides or hydrated oxides. The calcium ions react with the titanium species to give peroxo complexes which, when calcined later on, are decomposed to give a $CaTiO_3$ content of 0.5% in the conductive layer. At the end of the reaction, stirring at 75° C. is continued for 30 minutes, and the mixture is then allowed to settle for 10 hours. The solid is filtered off, washed with about 20 l of water until free of chloride, and dried at 110° C. The product thus obtained is calcined under a nitrogen/hydrogen gas atmosphere at 600° C. for 30 minutes.

The resistivity of the pigment is 2 kohm×cm. After one week, the resistivity rose to 3 kohm×cm and, after 4 weeks, to 6 kohm×cm.

Examples 2 to 8 are shown in the following Table 1 together, with a comparative example.

TABLE 1

Examples 2 to 8 and comparative example

| | Metered-in components in g | | | | | | Resistivity of the powder in kohm × cm after | | |
|---|---|---|---|---|---|---|---|---|---|
| Example | Mica | $TiCl_4$ | $ZnCl_2$ | $AlCl_3 \times 6H_2O$ | $MeCl_2 \times 6H_2O$[1] | Additive | Preparation | 1 week | 4 weeks |
| 2 | 50 | 1.4 | 166.3 | 11.8 | 1.6 | 1% of $CaTiO_3$ | 2 | 3 | 5 |
| 3 | 50 | 4.2 | 166.3 | 11.8 | 4.9 | 3% of $CaTiO_3$ | 2 | 3 | 4 |
| 4 | 50 | 0.5 | 166.3 | 11.8 | 0.7 | 0.5% of $SrTiO_3$ | 3 | 5 | 7 |
| 5 | 50 | 1.1 | 166.3 | 11.8 | 1.5 | 1% of $SrTiO_3$ | 3 | 4 | 6 |
| 6 | 50 | 3.2 | 166.3 | 11.8 | 4.4 | 3% of $SrTiO_3$ | 3 | 4 | 6 |
| 7 | 50 | 0.8 | 166.3 | 11.8 | 0.9 | 0.5% of $MgTiO_3$ | 3 | 4 | 8 |
| 8 | 50 | 0.4 | 166.3 | 11.8 | 0.5[2] | 0.5% of $BaTiO_3$ | 3 | 4 | 8 |
| Comparative Example | 50 | — | 166.3 | 11.8 | — | — | 2 | 4 | 8 |

[1]Me = Mg, Ca, Sr
[2]$BaCl_2 \times 2H_2O$

The pH is kept constant using 10% sodium hydroxide solution. Except for the comparative example, 10 ml of 30% $H_2O_2$ solution were metered in together with the sodium hydroxide solution.

In Examples 2 to 8, the pH was kept at a constant value of 9.0 and, in the comparative example (without additive), at a constant value of 7.0.

Example 9

50 g of mica having a particle size of <15 µm are suspended in 1800 ml of fully deionized water, the resulting suspension is heated to 75° C., and 900 ml of a solution containing 166.3 g of ZnCl2, 11.8 g of $AlCl_3 \times 6H_2O$, 2.4 g of $SnCl_4 \times 5H_2O$ (1% of $SnO_2$ in conductive layer) and 20 ml of 10% hydrochloric acid are continuously added with stirring over a period of 4 hours. At the end of the reaction, stirring at 75° C. is continued for 30 minutes, and the mixture is then allowed to settle for 10 hours. The solid is filtered off, washed with about 20 l of water until free of chloride, and dried at 110° C. The product thus obtained is calcined at 600° C. under a nitrogen/hydrogen gas atmosphere for 30 minutes.

The resistivity of the pigment is 3 kohm×cm. After one week, this value rises to 5 kohm×cm.

Example 10

The same conditions as those in Example 9 were used. The 2.4 g of $SnCl_4 \times 5H_2O$ were replaced by 11.8 g of $SnCl4 \times 5H_2O$, which corresponds to an $SnO_2$ content of 5% in the conductive layer.

The resulting pigment had a powder resistance of 4 kohm×cm. After one week, this value rises to 5 kohm×cm.

What is claimed is:

1. A stabilized conductive pigment comprising a conductive layer containing both aluminum doped zinc oxide, and an additive for stabilizing the electric conductivity which is an alkaline earth metal titanate.

2. A pigment according to claim 1, wherein the alkaline earth metal titanate is magnesium titanate, calcium titanate, strontium titanate or barium titanate.

3. A pigment according to claim 1, wherein the amount of the additive in the conductive layer is 0.5 to 5% by weight based on the weight of the layer.

4. A pigment according to claim 1, wherein the ratio of Zn/Al is 2:1 to 20:1.

5. A pigment according to claim 1, wherein the ratio of Zn/At is 5:1 to 10:1.

6. A pigment according to claim 1, which is unsupported.

7. A pigment according to claim 1, which is deposited on a support.

8. A pigment according to claim 7, wherein the support is natural or synthetic mica, a sheet silicate, or a glass platelet.

9. A pigment according to claim 8, wherein the support is talc, kaolin or sericite.

10. A pigment according to claim 8, wherein the support is mica having a particle size of less than 15 µm.

11. A pigment according to claim 7, wherein the support is a platelet-shaped pigment.

12. A pigment according to claim 7, wherein the support is a nacreous pigment.

13. A process for preparing a stabilized conductive pigment comprising a conductive layer containing both aluminum doped zinc oxide, and an additive for stabilizing the electric conductivity which is an alkaline earth metal titanate, wherein, in said process, salts of zinc, aluminum and additive are metered, either as combined or separate streams together with a hydrogen peroxide solution, continuously to an aqueous reaction medium, which optionally contains a suspension of a support, at a mixing ratio and in such a manner that hydrolysis of the salts and precipitation of hydroxides or hydrated oxides or, where a support is used, deposition on the support occur immediately, the pigment is optionally separated off, optionally washed, dried and calcined in a reducing inert gas atmosphere.

14. A pigment prepared by a process wherein salts of zinc, aluminum and a stabilizing additive which is an alkaline earth metal titanate are metered, either as combined or separate streams together with a hydrogen peroxide solution, continuously to an aqueous reaction medium, which optionally contains a suspension of a support, at a mixing ratio and in such a manner that hydrolysis of the salts and precipitation of hydroxides or hydrated oxides or, where a support is used, deposition on the support occur immediately, the pigment is optionally separated off, optionally washed, dried and calcined in a reducing inert gas atmosphere.

15. In a varnish, printing ink, plastic or coating, comprising a pigment, the improvement wherein the pigment comprises a conductive layer containing both aluminum doped zinc oxide, and an additive for stabilizing the electric conductivity which is an alkaline earth metal titanate.

16. In a varnish, printing ink, plastic or coating, comprising a pigment, the improvement wherein the pigment comprises a conductive layer containing both aluminum doped zinc oxide, and an additive for stabilizing the electric conductivity which is an alkaline earth metal titanate, said pigment being prepared by a process wherein salts of zinc, aluminum and additive are metered, either as combined or separate streams together with a hydrogen peroxide solution continuously to an aqueous reaction medium, which optionally contains a suspension of a support, at a mixing ratio and in such a manner that hydrolysis of the salts and precipitation of hydroxides or hydrated oxides or, where a support is used, deposition on the support occur immediately, the pigment is optionally separated off, optionally washed, dried and calcined in a reducing inert gas atmosphere.

\* \* \* \* \*